United States Patent Office 3,279,913
Patented Oct. 18, 1966

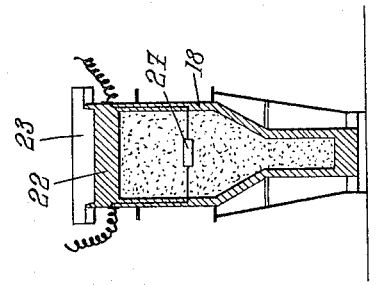
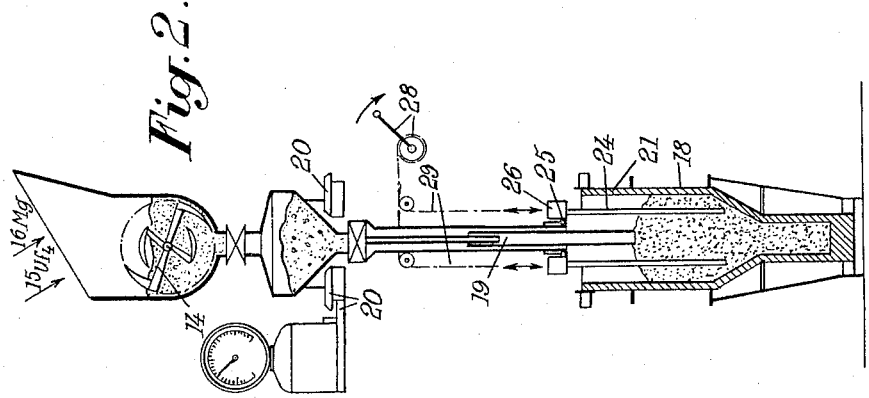
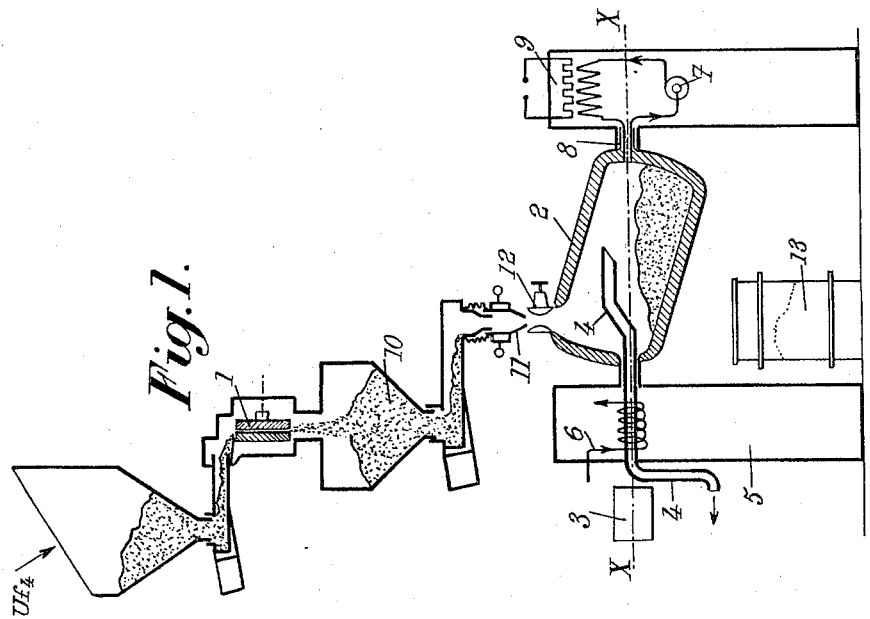

3,279,913
METHODS OF PREPARING URANIUM BY MAGNESIOTHERMY
Maurice Delange, Ballancourt, Henri Huet, Saint-Vrain, and Paul Vertes, Mennecy, France, assignors to Commissariat a l'Energie Atomique, Paris, France
Filed May 21, 1963, Ser. No. 282,065
Claims priority, application France, May 30, 1962, 899,312
5 Claims. (Cl. 75—84.1)

The present invention relates to methods for obtaining uranium by magnesiothermy; this term meaning reduction, by means of magnesium, of uranium fluoride. The invention is particularly concerned with the case where the uranium fluoride to be treated has relatively low specific gravity (for instance 1.65) such as uranium tetrafluoride produced by reduction and fluorination of uranium oxide, $UO_3$, obtained by calcination of ammonium diuranate (in particular according to U.S. Patent No. 3,069,227 for "Methods and Apparatus for the Obtaining of Uranium Fluoride" in the names of Paul Vertes, Jean Sauteron and Maurice Delange, U.S. patent application Ser. No. 771,029, filed October 31, 1958, and now U.S. Patent No. 3,198,598, for "Methods and Apparatus in Which a Mass of Solid Material Is Subjected to Two Successive Treatments by Gases" in the names of Maurice Delange, Henri Huet and Paul Vertes, U.S. patent application Ser. No. 102,734, filed April 13, 1961, for "Methods and Apparatus for the Preparation of Granular Products and in Particular of Uranium Oxide" in the names of Maurice Delange, Henri Huet and Paul Vertes, and U.S. patent application Ser. No. 102,740, filed April 13, 1961, and now abandoned, for "Method and Apparatus for the Obtainment of Uranium Fluoride" in the names of Maurice Delange, Henri Huet and Paul Vertes).

The chief object of our invention is to bring to a maximum, despite the low density of the fluoride and its porosity, the amount of heat available in the exothermic mixture which is to undergo the magnesiothermy operation.

For this purpose, according to an essential feature of our invention, we proceed to a degassing of the fluoride, preferably reduced into the state of powder, before mixing it with magnesium.

A preferred embodiment of our invention will be hereinafter described with reference to the appended drawings, given merely by way of example, and in which:

FIG. 1 is a diagrammatic vertical sectional view of an apparatus for treating uranium fluoride, according to the present invention;

FIG. 2 is a vertical sectional view of another apparatus to be used, according to the present invention, during a subsequent step of the method;

FIG. 3 is a vertical sectional view illustrating the magnesiothermy operation.

It will first be reminded that the magnesiothermy operation is based upon the following reaction:

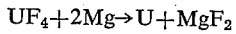

$$UF_4 + 2Mg \rightarrow U + MgF_2$$

which reaction is exothermic and gives off 82 calories.

In a general manner, the heat given off by the magnesiothermic reduction must be sufficient for causing the mixture to reach a temperature at least equal to the melting point of the most refractory compound (that is to say, the melting point of $MgF_2$, which is 2900° C.) so as to obtain a good decantation of uranium.

The difficulties are greater than in the case of calciothermy, because the exothermicity is lower (82 cal. instead of 134 in the case of calcium).

It is known, to improve these conditions, to make use of $UF_4$ as pure as possible, that is to say containing only a low amount of uranium oxide, because the reaction of said uranium oxide with magnesium is only weakly exothermic and also because uranium oxide has the effect of raising the melting point of the slag.

It is also known, to increase the heat contained in the charge in order to compensate for the relatively low exothermicity, to preheat the $UF_4$ and Mg mixture.

But the conditions may prove more delicate when starting from a fluoride of relatively low density, such as from uranium tetrafluoride obtained by reduction and fluorination of $UO_3$ produced for instance by calcination of ammonium diuranate.

This fluoride, which is generally obtained in the form of a mixture of powder and grains in variable proportions, has characteristics such as the following ones.

Chemical composition:
  $H_2O + HF$ _____ 0.1% max.
  $UO_2$ _____ 0.5±0.25%.
  $UO_2F_2$ _____ 1.5%±0.75%.
  $UF_4$ _____ 98%±1%.

specific gravity (when non-packed) $d$ averaging 1.65;
specific area=from 1 to 2 m.² per gram.

These characteristics make this product impossible or at least difficult to be treated for various reasons.

On the one hand, its high porosity causes the presence of a not negligible amount of gas occluded therein, and in particular of $H_2O$. Now, water vapor, during the heating period, reacts with $UF_4$ according to the following reaction:

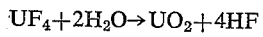

$$UF_4 + 2H_2O \rightarrow UO_2 + 4HF$$

which increases the percentage of $UO_2$ in the product and contributes in raising the melting point of the slag.

On the other hand, the fluoride in question is of low density, which contributes in reducing the heat contained in the charge.

In order to obviate these drawbacks, we proceed, according to the invention:

on the one hand, to a preliminary degassing of the tetrafluoride, that is to say a degassing operation performed before this fluoride is mixed with magnesium, it being well understood that it will be advantageous to crush this tetrafluoride before degassing; and on the other hand, to a packing operation, preferably carried out in the crucible on the mixture of $UF_4$ and Mg, which packing operation increases the density of said mixture, the latter being also subjected to a suitable crushing.

The operations to be performed according to the present invention are therefore, for instance, as follows:

(a) Crushing of $UF_4$ in such manner as to obtain a fine powder from the usual mixture of powder and grains;
(b) Degassing of this powder;
(c) Mixing of this powder with magnesium (in the form of powder and grains) and preferably another crushing;
(d) Loading into the crucible;
(e) Packing in said crucible;
(f) Closing of the crucible and magnesiothermic reaction.

These operations may be carried out in all suitable apparatus, and in particular in those hereinafter described:

(a) The crushing of $UF_4$ is effected for instance in a crusher 1 (FIG. 1), the elements of which may be, for instance, set at a distance of 5/10 mm. from each other.

The grains that are obtained may be of the following dimensions:

| | Microns |
|---|---|
| 85% | <200 |
| 10% | >400 |
| 5% | <400 |

The densities that are obtained are as follows:
Apparent density $d=2\pm0.1$.
Density that can be obtained after packing $d=2.5\pm0.1$.

(b) Concerning the degassing of this powder, it may be performed in a rotating cylinder 2 (or any other device capable of producing a stirring together with the degassing operation).

The operation is effected for instance under a vacuum at about 250° C. with a circulation of oil or any other fluid. This relatively low temperature does not permit hydrolysis of $UF_4$ by condensed $H_2O$ to take place in a substantial manner, which would have the unfavorable result of increasing the percentage of $UO_2$ in the fluoride.

The cylinder 2 employed for this purpose is arranged to rotate about a diagonal x—x, so as to produce stirring. In FIG. 1 the driving motor is shown at 3 and the pipe connected with the vacuum pump at 4, this pipe extending through one of the bearings. A condenser is provided at 5, the water circulation being diagrammatically shown at 6. The oil circulation device, together with its pump 7, is provided on the other side, at 8, the heating of oil taking place for instance in an electric heater 9.

Introduction of the crushed powder 10 to be degassed in cylinder 2 takes place through distributing means 11, for instance through a closable inlet 12 of cylinder 2. After degassing, the product is received in vessels 13 so as to be transported to the next operation. Of course other transportation means may be used and in particular the next portion of the apparatus might be fed in a continuous manner.

After degassing the percentage of $H_2O$ is, for instance, lower than 0.01, which is a checking up limit in common analysis.

The time of treatment in cylinder 2 ranges for instance from half an hour to one hour.

(c) Mixing of the powder thus obtained with magnesium (which may be in the form of grains) is effected in any suitable mixer in mixing apparatus 14. This apparatus therefore receives simultaneously, at 15 and 16 respectively, the degassed powder and the magnesium, the whole being passed into a hopper 17 disposed above crucible 18;

(d) From this hopper 17, the fine and degassed powder mixture of relatively low density is fed into the crucible by means of a telescopic tube 19 which, as the crucible is being filled, is lifted, either by manual control or by automatic control.

A weighing loader 20 may also be provided in order to obtain a load of powder of given weight.

The crucible 18 may be of any suitable type but it is advantageously coated on its inner surface with a layer 21 of magnesium fluoride obtained for instance from a powder packed on a table subjected to the action of a pneumatic shaking device, about a steel core. This crucible will be closed, after loading thereof, by a plug 22 of magnesium fluoride, the whole being then closed by a lid 23 bolted without joint;

(e) The means for packing the charge in the crucible are preferably made in such manner that this packing takes place normally with the loading. For this purpose, as shown, we make use of long rods 24 carried by a support 25 which is movable vertically and subjected to vibrations for instance by means of vibrating devices 26 (in particular pneumatic vibrating devices) working at a relatively high frequency, for instance of the order of 15,000 vibrations per minute.

In this way we may obtain for the mixture of $UF_4$ and Mg a final density of 2.6.

The vertical displacement of support 25 is for instance obtained automatically, in accordance with the level of filling, through means diagrammatically illustrated at 28, 29;

(f) Once the crucible has been packed with the above stated mixture powder, it is closed by means of plug 22 and cover 23, after which it is placed upon the sole of an electric furnace, in particular of the bell type.

Before this, we preferably place, in the mass to be caused to react, a chemical initiator 27 of the electric ignition type of the kind of that described in French Patent No. 1,227,980, filed June 30, 1960, in the name of the Commissariat à l'Energie Atomique.

We can thus obtain satisfactory uranium slugs with a yield of at least 95% despite the imperfections of the starting material concerning the low density thereof and the presence of occluded gas therein.

It should be reminded that it was already known to perform a magnesiothermy treatment from a powder of uranium tetrafluoride of high density averaging 3, without it being necessary to effect a packing other than manual. The apparent density of the charge in this case averages 3, which ensures a suitable conducivity.

The invention therefore permits, when starting from low density materials, of obtaining results as good as with starting materials of high density.

It is also known, when starting from a material of medium density, to place it in the form of bricks of the mixture of $UF_4$ and Mg, these bricks being piled up in the crucible and degassing taking place under vacuum during the rise of temperature. But this method does not permit a good filling of the crucible, in view of the spaces between the bricks.

Finally, it is found that the invention is of great interest in that it permits of using magnesium instead of calcium as reducing element for the obtainment of uranium, even in plants having but low producing capacities and which therefore cannot manufacture "heavy" uranium tetrafluoride, but which can, on the contrary, manufacture uranium tetrafluoride of low density in particular by reduction or fluorination of $UO_3$ resulting from the calcination of uranium diuranate.

In a general manner, while we have, in the above description, disclosed what we deem to be a practical and efficient embodiment of the invention, it should be well understood that we do not wish to be limited thereto as there might be changes made in the arrangement, disposition and form of the parts without departing from the principle of the present invention as comprehended within the scope of the appended claims.

What we claim is:

1. A method for the manufacture of metallic uranium from uranium tetrafluoride having a specific gravity of about 1.65, which method comprises crushing said uranium fluoride into a powder, degassing said powder, mixing the degassed powder with magnesium, charging the mixture thus obtained into a crucible, packing said mixture in the crucible and heating the crucible to start the exothermic reaction

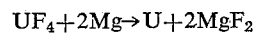

$$UF_4 + 2Mg \rightarrow U + 2MgF_2$$

2. A method according to claim 1 wherein the crushing operation is performed to yield a powder in which at least 85 percent of the particles have a grain size lower than 200 microns.

3. A method according to claim 2 wherein the degassing operation is effected at a temperature of about 250° C.

4. A method according to claim 1 wherein the degassing step is effected to reduce the amount of occluded gas to less than 0.01%.

5. A method according to claim 1 where the specific gravity of the mixture after packing thereof is at least equal to 2.6.

References Cited by the Examiner

UNITED STATES PATENTS

| | | | |
|---|---|---|---|
| 2,787,538 | 4/1957 | Spedding et al. | 75—84.1 |
| 2,886,429 | 5/1959 | Cooke et al. | 75—84.1 |
| 2,890,110 | 6/1959 | Baker | 75—84.1 |
| 2,964,308 | 12/1960 | Walde | 266—9 |
| 2,974,942 | 3/1961 | Teitel | 266—9 |
| 2,976,339 | 3/1961 | Gruber et al. | 266—34 |
| 3,088,822 | 5/1963 | Lloyd et al. | 75—84.1 |
| 3,119,686 | 1/1964 | Teitel | 75—84.1 |

FOREIGN PATENTS

| | | |
|---|---|---|
| 599,173 | 5/1960 | Canada. |
| 798,518 | 7/1958 | Great Britain. |

BENJAMIN R. PADGETT, *Primary Examiner.*

REUBEN EPSTEIN, *Examiner.*

R. L. GOLDBERG, M. J. SCOLNICK,
*Assistant Examiners.*